US006539432B1

(12) United States Patent
Taguchi et al.

(10) Patent No.: US 6,539,432 B1
(45) Date of Patent: Mar. 25, 2003

(54) NETWORK MANAGER, NODES AND NETWORK MANAGEMENT SYSTEM

(75) Inventors: Yuichi Taguchi, Fujisawa (JP); Takashi Nishikado, Ebina (JP); Takanori Miyamoto, Fuchu (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/313,254

(22) Filed: May 18, 1999

(30) Foreign Application Priority Data

May 19, 1998 (JP) .......................................... 10-136634

(51) Int. Cl.[7] ............................................. G06F 15/16
(52) U.S. Cl. ...................... 709/227; 709/228; 709/229; 709/230; 370/232; 370/235; 370/252; 370/254; 370/351
(58) Field of Search ................................ 709/227–230; 370/235, 252, 351, 409, 232, 254

(56) References Cited

U.S. PATENT DOCUMENTS

| | | | | |
|---|---|---|---|---|
| 5,339,318 A | * | 8/1994 | Tanaka et al. ............... | 370/399 |
| 5,805,072 A | * | 9/1998 | Kakemizu .............. | 340/825.03 |
| 5,987,521 A | * | 11/1999 | Arrowood et al. .......... | 709/239 |
| 6,002,668 A | * | 12/1999 | Miyoshi et al. ............. | 370/232 |
| 6,104,699 A | * | 8/2000 | Holender et al. ........... | 370/235 |
| 6,108,304 A | * | 8/2000 | Abe et al. .................... | 370/232 |
| 6,275,494 B1 | * | 8/2001 | Endo et al. .................. | 370/395 |
| 6,278,693 B1 | * | 8/2001 | Aldred et al. ............... | 370/252 |
| 6,304,555 B1 | * | 10/2001 | Yoshimoto et al. ......... | 370/254 |
| 6,304,577 B1 | * | 10/2001 | Nagami et al. ............. | 370/409 |

OTHER PUBLICATIONS

"Computer and Network LAN" Dec. 1996, pp. 2–12 Ohm Company.
"Internet working with TCP/IP" 1991, pp. 112–115.

* cited by examiner

*Primary Examiner*—Nabil El-Hady
(74) *Attorney, Agent, or Firm*—Antonelli, Terry, Stout & Kraus, LLP

(57) ABSTRACT

In a communication network constituted of relay nodes and edge nodes interconnected by communication lines and a network manager, the network manager manages relay nodes and edge nodes connected to the network manager by operation management communication lines. The network manager requests to set a logical connection between an ingress and an egress of the connection, and in response to this request, relay nodes and edge nodes set a logical connection specifying at least one of a transmission source and a destination.

4 Claims, 15 Drawing Sheets

FIG. 4

IP − LOGICAL CONNECTION CONVERSION INFORMATION 650

| NODE IDENTIFIER 652 | IP − LOGICAL CONNECTION CONVERSION INFORMATION OF EACH NODE 654 |
|---|---|
| n1 | ×××1 |
| n2 | ×××2 |
| ⋮ | ⋮ |

FIG. 5

IP − LOGICAL CONNECTION CONVERSION INFORMATION OF EACH NODE 654

| 654A | 654B | 654C | 654D | 654E | 654F | 654G | 654H | 654I | 654J | 654K |
|---|---|---|---|---|---|---|---|---|---|---|
| P1 | 13.0.0.1 | 24 | TCP | Telnet | P0 | 10.0.0.1 | 32 | TCP | Telnet | 64 |
| P1 | 13.0.0.1 | 24 | TCP | Ftp | P0 | 10.0.0.1 | 32 | TCP | Ftp | 64 |
| ... | ... | ... | ... | ... | ... | ... | ... | ... | ... | ... |

FIG. 6

LOGICAL CONNECTION MANAGEMENT INFORMATION 660

| ROUTING INFORMATION 662 | QoS INFORMATION 664 |
|---|---|
| ROUTE 1 | Class1 , Class2 |
| ROUTE 2 | Class1 , Class2 |
| ... | ... |

FIG. 7

ROUTING INFORMATION 662

| NODE IDENTIFIER | INPUT I/F NUMBER | OUTPUT I/F NUMBER | INPUT CONNECTION IDENTIFIER | OUTPUT CONNECTION IDENTIFIER |
|---|---|---|---|---|
| n1 | — | p0 | — | i64 |
| n5 | p1 | p3 | i64 | i70 |
| n7 | p1 | p2 | i70 | i90 |
| n4 | p0 | — | i90 | |

QoS INFORMATION 664

| QoS CLASS IDENTIFIER | NODE COMMON QoS PARAMETER | | |
|---|---|---|---|
| Class1 | 1 | 0 | 0 |
| Class2 | 0 | 0 | 1 |

QoS PARAMETER CONVERSION INFORMATION 670

| NODE TYPE IDENTIFIER 672 | NODE TYPE DEPENDENT QoS PARAMETER CONVERSION INFORMATION 674 |
|---|---|
| ATM SWITCH | ATM SWITCH QoS PARAMETER CONVERSION INFORMATION |
| FRAME RELAY SWITCHING SYSTEM | FRAME RELAY QoS PARAMETER CONVERSION INFORMATION |
| ROUTER | ROUTER QoS PARAMETER CONVERSION INFORMATION |
| ... | ... |

FIG. 10

NODE TYPE DEPENDENT QoS PARAMETER CONVERSION INFORMATION 674

| QoS CLASS IDENTIFIER 674A | NODE TYPE DEPENDENT QoS PARAMETER CONVERSION INFORMATION OF EACH CLASS 674B |
|---|---|
| CLASS1 | CLASS1 NODE TYPE DEPENDENT QoS PARAMETER CONVERSION INFORMATION |
| CLASS2 | CLASS2 NODE TYPE DEPENDENT QoS PARAMETER CONVERSION INFORMATION |
| ... | ... |

FIG. 11

NODE TYPE DEPENDENT QoS PARAMETER CONVERSION INFORMATION OF EACH CLASS 674B

674BA        674BB

| NODE TYPE DEPENDENT PARAMETER IDENTIFIER | NODE TYPE DEPENDENT QoS PARAMETER COMPUTING FUNCTION |
|---|---|
| Peak Cell Rate | PCR COMPUTING FUNCTION |
| Sustainable Cell Rate | SCR COMPUTING FUNCTION |
| ... | ... |

FIG. 12

NODE TYPE DEPENDENT QoS PARAMETER COMPUTING FUNCTION 674BB

674BBA      674BBB (674BBB-1 ~ 674BBB-n)

| CONSTANT PARAMETER | NODE COMMON QoS CORRESPONDENCE COEFFICIENTS | | |
|---|---|---|---|
| 1 | 2 | 1 | 0.5 |
| 0 | 1 | 1 | 0.5 |

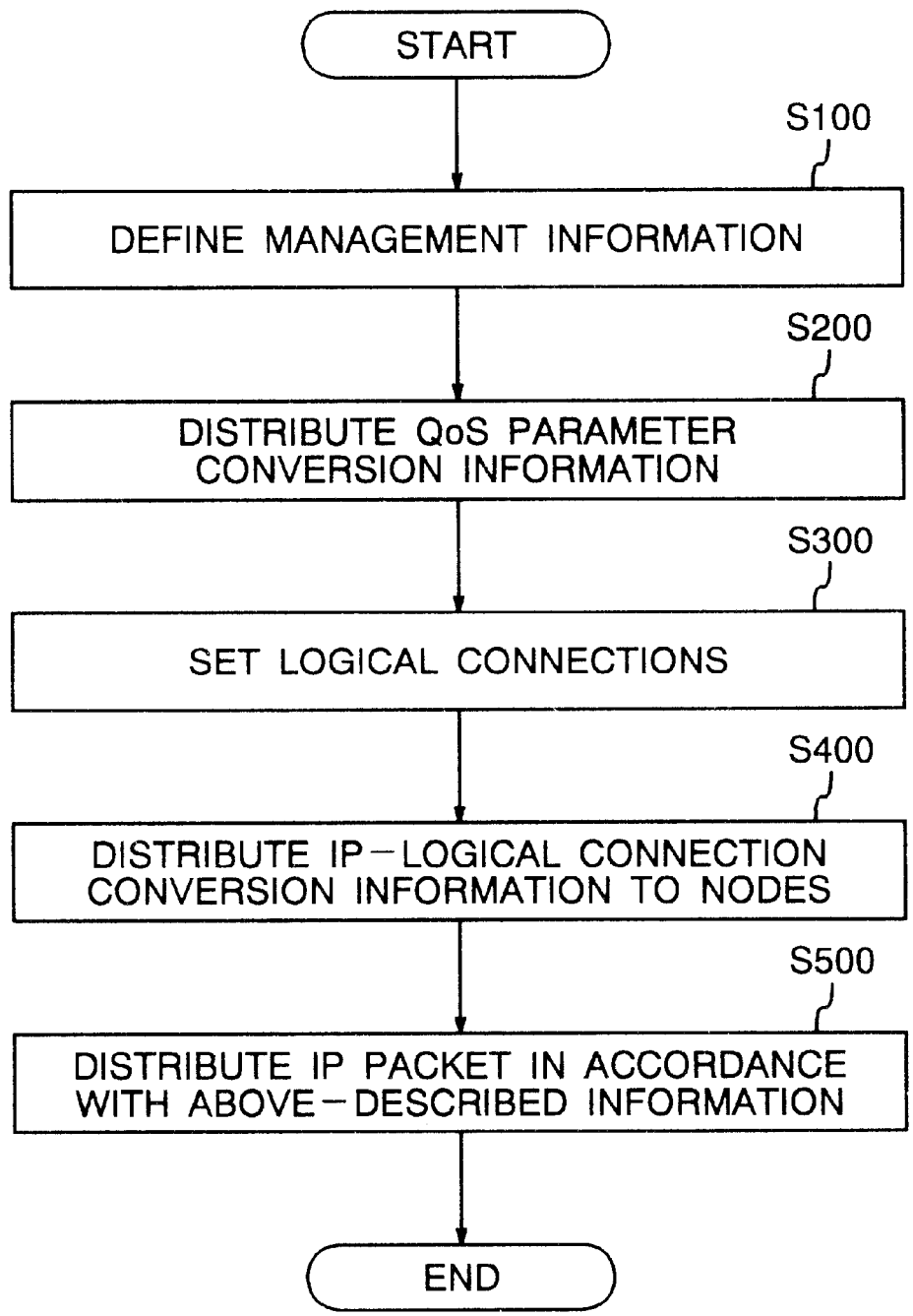

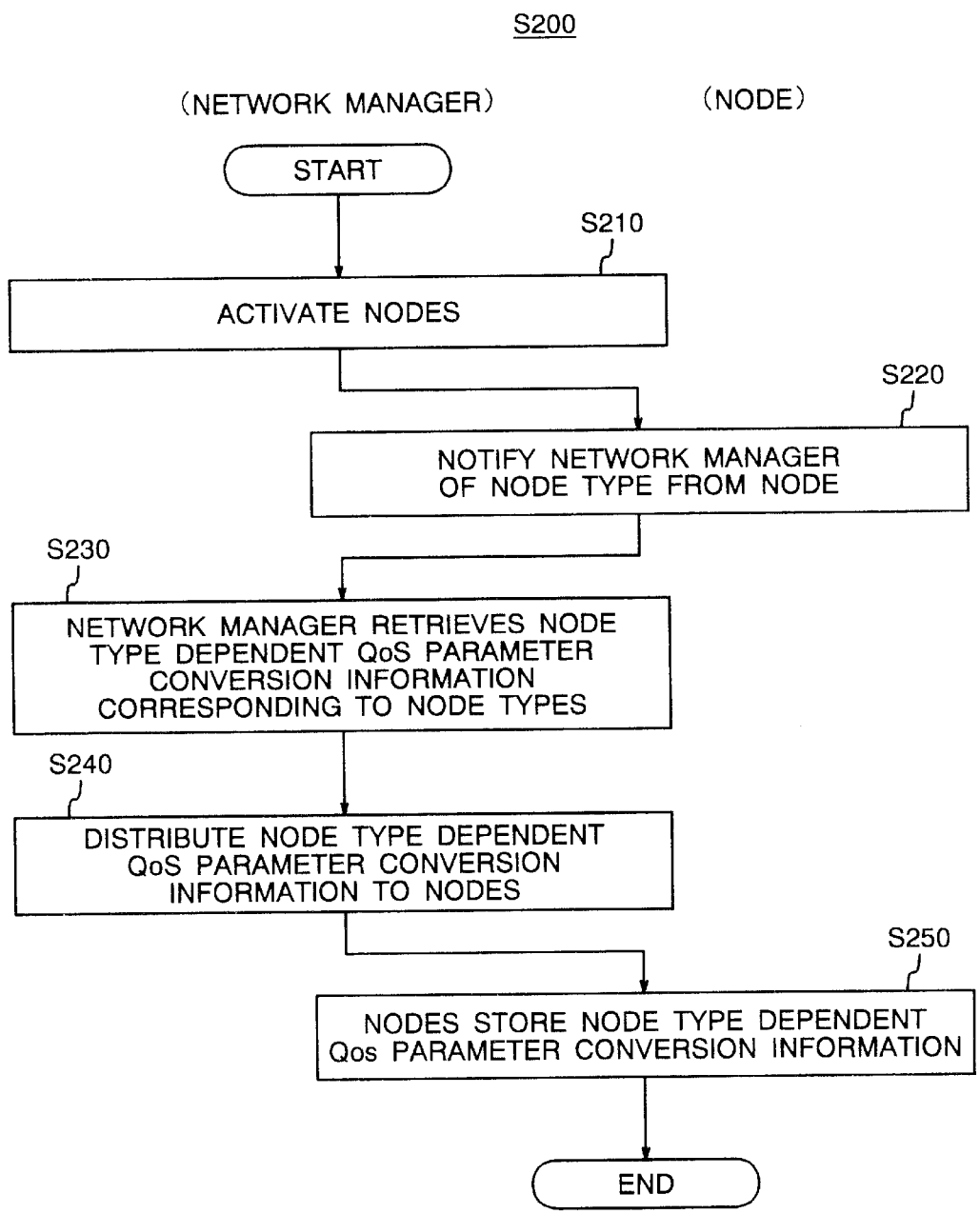

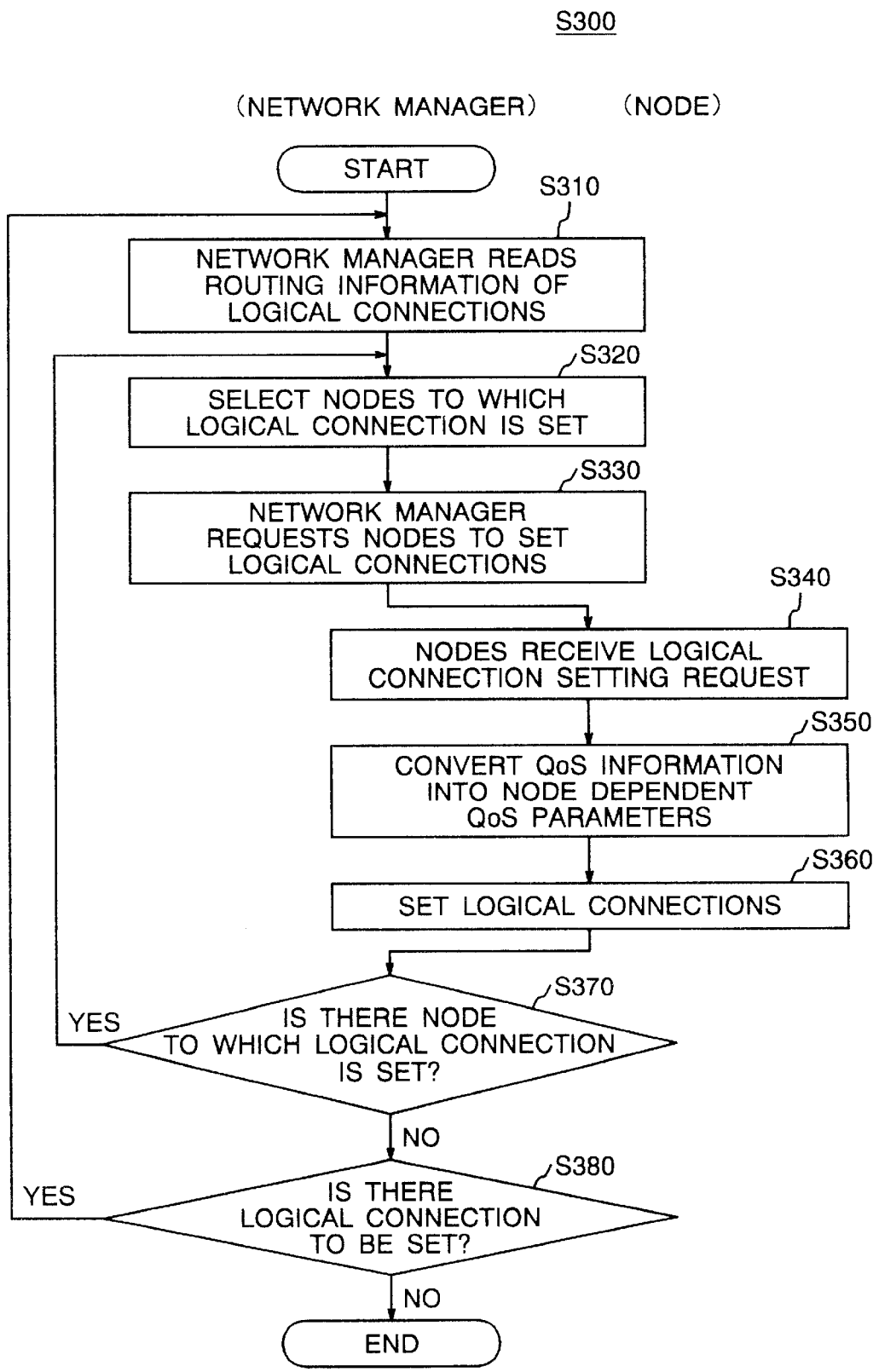

NETWORK MANAGER, NODES AND NETWORK MANAGEMENT SYSTEM

BACKGROUND OF THE INVENTION

1. Field of the Invention

The present invention relates to a network manager, nodes and a network management system, and more particularly to a network manager, nodes and a network management system suitable for realizing highly reliable communications in a large scale network such as telecommunications carrier.

2. Description of the Related Art

The Internet configures a network by using routers. As described, for example, in "Mastering TCP/IP" an introduction volume, published on Jun. 24, 1994 (Ohm Company), pp. 134–139, a router determines a forward site of a received packet by referring to a destination IP address written in an IP header field of the packet and a routing table of the router, and forwards the packet to the determined forward site.

As described, for example, in "Computer and Network LAN", December 1996 (Ohm Company), pp. 2–12, an IP packet transfer method using an asynchronous transfer mode (ATM) is known. With this method, each ATM node monitors a flow of an IP packet, and when an IP packet flow having a speed higher than a predetermined value and the same destination and application is detected, a logical connection is established between adjacent ATM nodes to thereafter transfer the IP packet having the same destination by using the established logical connection.

With a conventional router system, however, if accesses are concentrated upon a server program at a particular Web site, the communication traffics to an application of this Web site hinders other IP traffics.

The above-described conventional ATM method sets a logical connection for each data flow. Therefore, the number of logical connections may become insufficient in a large scale network. In addition, since the logical connection is dynamically set in accordance with judgements by local or adjacent nodes to transfer an IP packet, communication traffics to an application of a particular Web site may hinder other IP traffics, similar to the conventional router system.

SUMMARY OF THE INVENTION

It is a first object of the present invention to provide a network manager, nodes and a network management system wherein even if accesses are concentrated upon a particular application, the communication traffics to the application do not hinder other IP traffics irrespective of whether a router system and an ATM method are used.

It is a second object of the present invention to provide a network manager capable of supplying a sufficient number of logical connections in an ATM network.

(1) In order to achieve the first object of the invention, a network manager of this invention for managing relay nodes and edge nodes constituting a communication network, comprises logical connection setting request means for requesting relay nodes and edge nodes to set a logical connection specifying at least one of a source and a destination between an ingress and an egress of the connection.

With this configuration, an access to a particular application is transferred to a logical connection. Therefore, even if accesses are concentrated, the communication traffics to the application do not hinder other IP traffics.

(2) The network manager described in (1) may further comprises distributing means for distributing QoS (Quality of Service) parameter conversion information to the relay nodes and edge nodes, the QoS parameter conversion information being used when node independent QoS parameters are converted into node dependent QoS parameters.

With this configuration, the network manager can set the QoS by designating node independent QoS parameters so that the QoS independent from node types can be guaranteed.

(3) In order to achieve the first embodiment, in a network management system of this invention having relay nodes and edge nodes constituting a communication network and a network manager for managing the relay nodes and edge nodes, the network manager comprises logical connection setting request unit for requesting relay nodes and edge nodes to set a logical connection between an ingress and an egress of the connection; and the relay nodes and the edge nodes each comprise logical connection setting unit responsive to a request by the logical connection setting request unit for setting a logical connection specifying at least one of a transmission source and a destination.

With this configuration, an access to a particular application is transferred to a logical connection. Therefore, even if accesses are concentrated, the communication traffics to the application do not hinder other IP traffics.

(4) In order to achieve the second object, a network manager of this invention for managing relay nodes and edge nodes constituting a communication network comprises logical connection setting request unit for requesting to set a logical connection between an ingress and an egress of the connection, by not limiting a transmission source of the logical connection to be set and by limiting a destination IP address or destination IP address and IP sub-net mask, a destination transport layer protocol type, and a destination application port number.

With this configuration, a logical connection not specifying a transmission source can be set. Since the same logical connection can be used for multiplex communications, the number of logical connections does not become insufficient.

BRIEF DESCRIPTION OF THE DRAWINGS

FIG. 4 a diagram showing IP-logical connection conversion information used by the network management system of the embodiment.

FIG. 5 a diagram showing IP-logical connection conversion information used by the network management system of the embodiment.

FIG. 6 is a diagram showing logical connection information used by the network management system of the embodiment.

FIG. 7 is a diagram showing logical connection information used by the network management system of the embodiment.

FIG. 8 is a diagram showing logical connection information used by the network management system of the embodiment.

FIG. 9 is a diagram showing QoS (quality of service) parameter conversion information used by the network management system of the embodiment.

FIG. 10 is a diagram showing QoS parameter conversion information used by the network management system of the embodiment.

FIG. 11 is a diagram showing QoS parameter conversion information used by the network management system of the embodiment.

FIG. 12 is a diagram showing QoS parameter conversion information used by the network management system of the embodiment.

FIG. 13 is a flow chart illustrating the whole processes to be executed by the network management system of the embodiment.

FIG. 14 is a flow chart illustrating the detailed contents of a QoS parameter conversion information transfer process to be executed by the network management system of the embodiment.

FIG. 15 is a flow chart illustrating the detailed contents of a logical connection setting process to be executed by the network management system of the embodiment.

DETAILED DESCRIPTION OF THE EMBODIMENTS

A network management system according to an embodiment of the invention will be described with reference to FIGS. 1 to 21.

Figure 1:
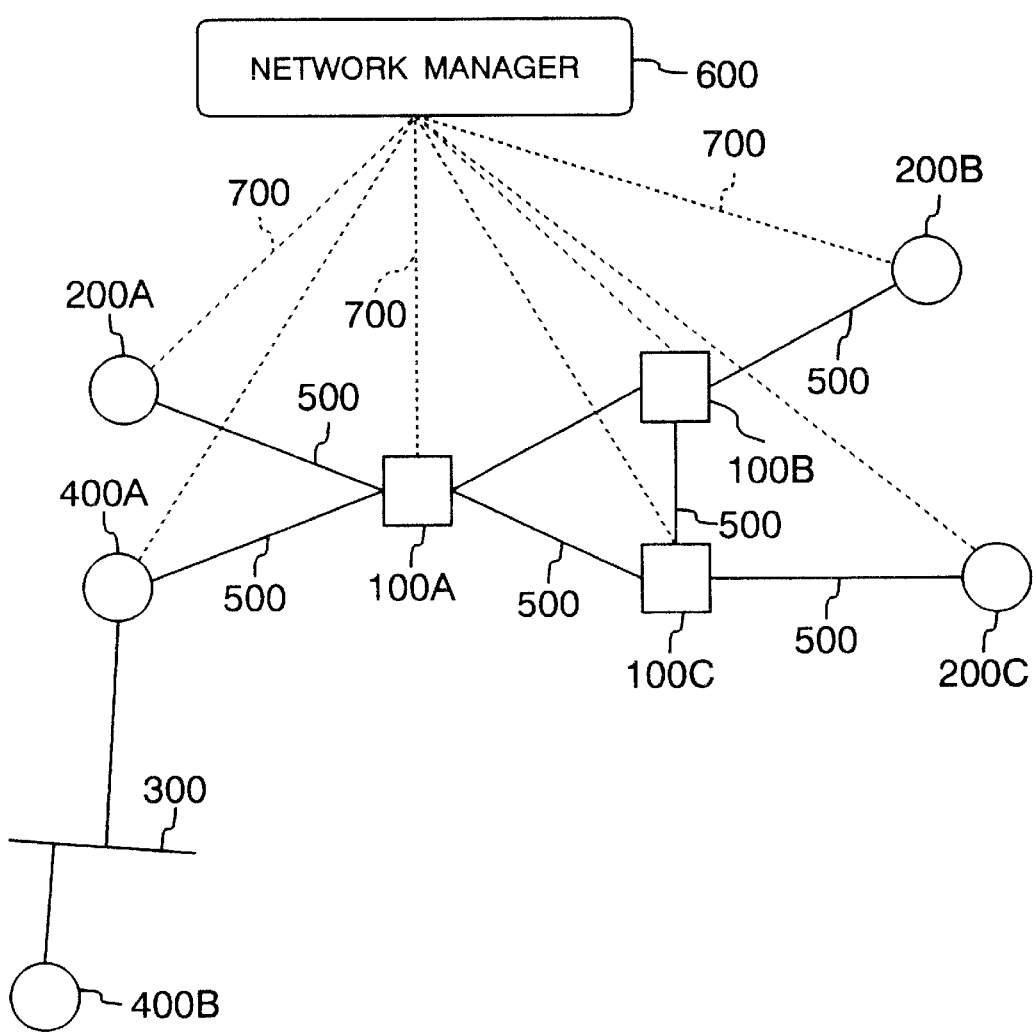
FIG. 1 is a diagram illustrating the configuration of a communication network to which a network management system according to an embodiment of the invention is applied.

First, with reference to FIG. 1, a communication network to which the network management system of the embodiment is applied will be described.

In this embodiment, the communication network is configured by a plurality of relay nodes 100A, 100B and 100C and a plurality of edge nodes 200A, 200B, 200C and 400, respectively interconnected by communication lines 500. The relay nodes 100A, 100B and 100C are routers or switches, and the edge nodes are terminals 200A, 200B and 200C and a gateway 400 to an external network 300.

A network manager 600 is connected to all relay nodes 100A, 100B and 100C and edge nodes 200A, 200B, 200C and 400 by physical or logical operation management communication lines 700. The network manager 600 manages to set a logical connection between nodes of the communication network and to transfer an IP packet to the logical connection, the details of which will be later given with reference to FIG. 2.

Another gateway 400B is connected to the external network 300.

In the following description, the relay nodes 100A, 100B and 100C are collectively represented by a relay node 100 because they have the same function regarding the network control method of the embodiment. Also the edge nodes 200A, 200B, 200C and 400 are collectively represented by edge nodes 200 and 400 because they have the same function regarding the network control method of the embodiment.

Figure 2:
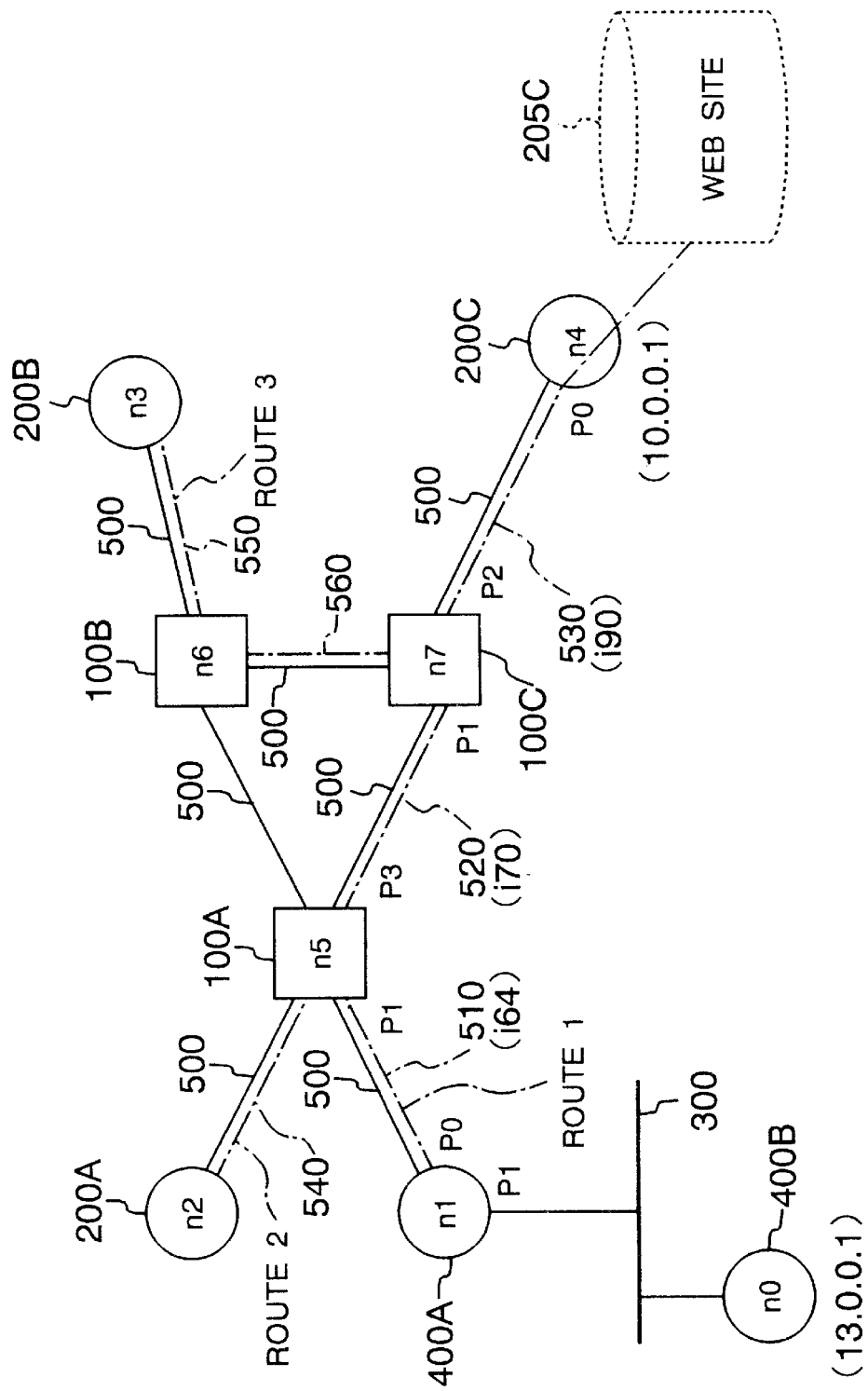
FIG. 2 is a diagram illustrating an example of logical connections between nodes of a communication network, the logical connections being set and managed by a network manager used by the network management system of the embodiment.

Next, with reference to FIG. 2, an example of a logical connection between nodes of the communication network will be described, the connection being managed and set by the network manager 600 of this embodiment. In FIG. 2, like elements to those shown in FIG. 1 are represented by using identical reference numerals.

A plurality of relay nodes 100A, 100B and 100C and edge nodes 200A, 200B, 200C and 400 are connected by communication lines 500 indicated by solid lines to thereby configure the communication network.

It is assumed that the terminal 200C operates as a Web server and the communication traffics are concentrated upon an application of a particular Web site 205C under management of the terminal 200C. An example of logical connections established in such a state among the gateway 400A, the terminals 200A, 200B and 200C will be described.

A "route 1" indicated by a one-dot chain line in FIG. 2 is a logical connection established between the gate way 400A and the terminal 200C. The "route 1" is constituted of a logical connection 510 between the gateway 400A and the relay node 100A, a logical connection 520 between the relay node 100A and the relay node 100C and a logical connection 530 between the relay node 100C and the terminal 200C.

A "route 2" is a logical connection established between the terminals 200A and 200C. The "route 2" is constituted of a logical connection 540 between the terminal 200A and the relay node 100A, the logical connection 520 between the relay nodes 100A and 100C and the logical connection 530 between the relay node 100C and the terminal 200C. The logical connections 520 and 530 are set in common for both the routes 1 and 2.

A "route 3" is a logical connection established between the terminals 200B and 200C. The "route 3" is constituted of a logical connection 550 between the terminal 200B and the relay node 100B, a logical connection 560 between the relay nodes 100B and 100C and the logical connection 530 between the relay node 100C and the terminal 200C. The logical connection 530 is set in common for the routes 1, 2 and 3.

A node identifier of the gateway 400A is represented by "n1". A node identifier of the terminal 200A is represented by "n2", a node identifier of the terminal 200B is represented by "n3", and a node identifier of the terminal 200C is represented by "n4". A node identifier of the relay node 100A is represented by "n5", a node identifier of the relay node 100B is represented by "n6", and a node identifier of the relay node 100C is represented by "n7".

A connection identifier of the logical connection 510 is represented by "i64", the logical connection 510 being set between an output port "p0" of the network interface of the gateway 400A and an input port "p1" of the network interface of the relay node 100A. A connection identifier of the logical connection 520 is represented by "i70", the logical connection 520 being set between an output port "p3" of the network interface of the relay node 100A and an input port "p1" of the network interface of the relay node 100C. A connection identifier of the logical connection 530 is represented by "i90", the logical connection 530 being set between an output port "p2" of the network interface of the relay node 100C and an input port "p0" of the network interface of the terminal 200C. Similarly, the connection identifiers of the other logical connections 540, 550 and 560 are set and the input/output ports of the network interface of the edge nodes and relay nodes are set.

An IP address of the gateway 400B is represented by "13. 0. 0. 1" and the IP address of the terminal 200C is represented by "10. 0. 0. 1".

Next, with reference to FIG. 3, the structures and controls of the network manager 600 and nodes including the relay nodes 100 and edge nodes 200 and 400 of the embodiment will be described.

The network manager 600 manages to set a logical connection between nodes of the communication network and to transfer an IP packet to the logical connection. The network manager 600 has a management information definition unit 610. The management information definition unit 610 stores, in an internal storage device of the network manager 600, IP-logical connection conversion information 650, logical connection management information 660 and QoS parameter conversion information 670, respectively defined and entered by a network management person.

The IP-logical connection conversion information 650 is information representative of a correspondence between each logical connection and an IP packet to be flowed thereon. The details of the IP-logical connection conversion information 650 will be later given with reference to FIGS. 4 and 5.

The logical connection management information 660 is constituted of routing information and QoS information necessary for setting each logical connection. The details of the logical connection management information will be later given with reference to FIGS. 6 to 8.

The QoS parameter conversion information 670 is information used for converting node independent QoS parameters into node dependent QoS parameters. The details of the QoS parameter conversion information 670 will be later given with reference to FIGS. 9 to 12.

The network manager 600 has a QoS parameter conversion information distribution unit 620. The QoS parameter conversion information distribution unit 620 operates in cooperation with QoS parameter conversion information initialization units 110, 210 and 410 of the nodes 100, 200 and 400, and selects QoS parameter conversion information 674 from the QoS parameter conversion information 670 in accordance with the node type information 672 acquired from each node and distributes the selected information. The nodes 100, 200 and 400 have node type dependent QoS parameter conversion information storage devices 150, 250 and 450 and store the supplied QoS parameter conversion information 674 in the node type dependent QoS parameter conversion information storage devices 150, 250 and 450.

The network manager 600 has a logical connection setting request unit 630. In accordance with the logical connection management information 660 and IP-logical connection conversion information 650, the logical connection setting request unit 630 sets a logical connection and notifies the nodes 100, 200 and 400 of the transfer relation between each IP packet and each logical connection. The nodes 100, 200 and 400 have logical connection setting units 120, 220 and 420. The logical connection setting units 120, 220 and 420 set the designated logical connections 510, . . . , 560 by referring to the node type dependent QoS parameter conversion information storage devices 150, 250 and 450, in response to an instruction from the logical connection setting request unit 630 of the network manager 600. The edge nodes 200 and 400 have IP-logical connection conversion information storage devices 260 and 460. The logical connection setting units 220 and 420 store the IP-logical connection conversion information 650 supplied from the logical connection setting request unit 630 of the network manager 600, in the IP-logical connection conversion information storage devices 260 and 460. The relay node 100 has a connection identifier conversion information storage device 170. The logical connection setting unit 120 stores in the connection identifier conversion information storage device 170 a correspondence between an input/output interface and an input/output logical connection identifier supplied when the logical connection is set.

The nodes 100, 200 and 400 have packet transfer units 130, 230 and 430 for transferring an IP packet. Upon reception of an IP packet from the communication line 500, the packet transfer units 230, 430 of each edge node 200, 400 refer to the IP-logical connection conversion information storage devices 260, 460 and add the logical connection identifier of the corresponding logical connection to the IP packet and transfer the packet to a proper logical connection. The packet transfer unit 130 of the relay node 100 refers to the connection identifier conversion information 170 to select the destination based upon the connection identifier of the received packet, and after it replaces the connection identifier, transfers the packet to the proper interface line.

Next, with reference to FIGS. 4 and 5, the contents of the IP-logical connection conversion information 650 will be described.

As shown in FIG. 4, the IP-logical connection conversion information 650 is stored in a table constituted of the field of a node identifier 652 of each of all the edge nodes 200 and 400 on the logical connections defined by the management information definition unit 610 and the field of the IP-logical connection conversion information 654 for each node. As the node identifier 652, the node identifier "n1" of the gateway 400A, the node identifier "n2" of the terminal 200A, and the like shown in FIG. 2 are stored. As the IP-logical connection conversion information 654 for each node, for example, "xxx1", "xxx2" and the like are stored, the details of which will be given with reference to FIG. 5.

As shown in FIG. 5, the IP-logical connection conversion information 654 for each node is stored as a list which defines all logical connections passing through the edge nodes 200 and 400 designated by the corresponding node identifier 652. In the example shown in FIG. 5, the contents of the IP-logical connection conversion information for the node identifier "n1" are "xxx1".

The IP-logical connection conversion information 654 for each node is stored in the list which stores combinations of: a source IP address 654B; a source IP sub-net mask 654C; a source transport layer protocol type 654D; a source application port number 654E; a destination IP address 654G; a destination IP sub-net mask 654H; a source transport layer protocol type 654I; a destination application port number 654J; an input network interface number 654A and an output network interface number 654F of the network interfaces to be connected to the edge nodes 200 and 400 by the logical connection; and a connection identifier 654K.

For example, as shown in FIG. 5, as the source IP address 654B, the IP address "13. 0. 0. 1" of the gateway 400B shown in FIG. 2 is stored. As the destination IP address 654G, the IP address "10. 0. 0. 1" of the terminal 200C shown in FIG. 2 is stored. As the source transport layer protocol type 654D and the destination transport layer protocol type 654I, "TCP (transmission control protocol)" is stored.

As the source application port number 654E and the destination application port number 654J, "Telnet" and "Ftp" are stored respectively. As the connection identifier 654K, the connection identifier "i64" of the logical connection 510 shown in FIG. 2 is stored.

The IP-logical connection conversion information 650 is information used by the edge nodes 200 and 400 in order to convert or inversely convert the IP information of an IP packet flowing on the logical connection into the connection identifier 654K and transmits or receives the IP packet to or from the logical connection.

Of the IP-logical connection conversion information 654 for each node, whether each of the entries (654A, 654B, 654C, 654D, 654E, 654F, 654G, 654H, 654I, and 654J) excepting the connection identifier 654 is taken into consideration when a correspondence between a logical connection and an IP packet is calculated, can be judged from the value of the entry or the valid/invalid information of the entry. For example, if "1" is set to all bits of the destination IP sub-net mask 654H, the packet transferred to this logical connection is only the packet whose destination matches the destination IP address 654G. If "0" is set to all bits of the source IP sub-net mask 654C, the destination IP address 654B is ignored. If negative numbers are assigned to the input/output network interface numbers 654A and 654F, source/destination transport layer protocol types 654D and 654I, and to application port numbers 654E and 654J, the information in each of these entries is ignored.

In this embodiment, if some entry is made invalid, an IP packet having a different value of this entry can be transferred (multiplexed) on the same logical connection. It is therefore possible to reduce the number of logical connections to be used and to solve the problem of an insufficient number of logical connections in a large scale network. It is also possible to flexibly set the conditions of using logical connections.

If the source IP address 654B, source IP sub-net mask 654C, source transport layer protocol type 654D and source application port number 654E are set as "invalid" and if the destination IP address 654G, destination IP sub-net mask 654H, destination transport layer protocol type 654I and destination application port number 654J are set as "valid", then a specific connection can be set by limiting the destination IP address, destination IP sub-net mask, destination transport layer protocol type and destination application port number, without limiting the transmission source.

Next, with reference to FIGS. 6 to 8, the contents of the logical connection management information 660 will be described.

As shown in FIG. 6, the logical connection management information 660 is stored in a table corresponding to each logical connection. Each table entry is constituted of routing information 662 of nodes on a logical connection and QoS information 664 assigned to the logical connection. As the routing information 662, the route name of each logical connection shown in FIG. 2 such as "route 1" and "route 2" is stored. As the QoS information 664, the information of QoS assigned to each logical connection such as "Class 1" and "Class 2" is stored. An example of the details of the routing information 662 will be described with reference to FIG. 7, and an example of the QoS information 664 will be described with reference to FIG. 8.

As shown in FIG. 7, the routing information 662 is stored in a table which enumerates entries in the route order indicating the connection information at each node. Each entry of this table is constituted of: a node identifier 662A of a node on a logical connection; and input I/F number 662B of the network interface via which a packet on the logical connection reaches the node, an output I/F number 662C of the network interface which is used when a packet is transmitted from the node to the logical connection; an input connection identifier 662D which is possessed by the packet on the logical connection when it reaches the node; and an output connection identifier 662E which is possessed by the packet when it is transmitted from the node to the logical connection.

The example shown in FIG. 7 shows the connection information 662 of the "route 1" shown in FIG. 2. Specifically, the information stored at the first row of FIG. 7 indicates that the gateway 400A having the node identifier "n1" is set with the logical connection 510 constituting the "route 1" shown in FIG. 2 on the output port side and that the output port "p0" of the network interface of the gateway 400A is set with the connection identifier "i64". The information stored at the second row indicates: that the relay node 100A having the node identifier "n5" is set with the logical connection 510 constituting the "route 1" shown in FIG. 2 on the input port side; that the input port "p1" of the network interface of the relay node 100A is set with the connection identifier "i64"; that the logical connection 520 constituting the "route 1" shown in FIG. 2 is set to the output port side; and that the output port "p3" of the network interface of the relay node 100A is set with the connection identifier "i70". Similarly, the information stored at the third row indicates that the logical connections 520 and 530 are set to the input/output sides of the relay node 100C shown in FIG. 2, and the information stored at the fourth row indicates that the logical connection 530 is set to the input side of the terminal 200C shown in FIG. 2.

As shown in FIG. 8, the QoS information 664 is constituted of a QoS class identifier 664A representative of a rank of QoS assigned to the logical connection and node common QoS parameters of the QoS class. The node common QoS parameters 664B include a plurality of node common QoS parameters 664B-1 to 664B-n. The node common QoS parameters 664B are parameters not dependent on the communication type of a node. For example, they designate a value of bandwidth information.

The contents of the QoS parameter conversion information 670 will be described with reference to FIGS. 9 to 12.

FIGS. 9 to 12 are diagrams showing QoS parameter conversion information to be used by the network management system of the embodiment.

As shown in FIG. 9, the QoS parameter conversion information 670 is stored in a table constituted of a field of a node type identifier 672 and a field of a node type dependent QoS parameter conversion information 674. The table has table entries for all types of nodes constituting the communication network.

For example, the node type identifier 672 includes "ATM switch", "frame relay switching system", and "router". As the corresponding node type dependent QoS parameter conversion information 674, "ATM switch QoS parameter conversion information", "frame relay switching system QoS parameter conversion information", and "router QoS parameter conversion information" are stored. The details of the node type dependent QoS parameter conversion information 674 will be described with reference to FIG. 10.

As shown in FIG. 10, the node type dependent QoS parameter conversion information 674 is constituted of a field of a QoS class identifier 674A and a field of a node type dependent QoS parameter conversion information 674B of the class. The QoS class identifier 674A is an identification number for identifying the QoS class representative of the rank of QoS to be guaranteed in the network. For example, the QoS class identifier 674A is "Class 1", "Class 2" and the like. The node type dependent QoS parameter conversion information 674B of each class is, for example, QoS parameter conversion information of the node type "ATM switch" with the QoS class of "Class 1" and "Class 2". The details of the node type dependent QoS parameter conversion information 674B of each class will be given with reference to FIG. 11.

As shown in FIG. 11, the node type dependent QoS parameter conversion information 674B of each class is information used for converting the node common QoS parameters into node type dependent QoS parameters of the corresponding QoS class, and is constituted of a field of a node type dependent parameter identifier 674BA for identifying the kind of parameters and a field of a node type dependent QoS parameter computing function 674BB.

In the example shown in FIG. 11, the node type dependent QoS parameter conversion information 674B for the node type "ATM switch" and the QoS class "Class 1" is shown. The node type dependent parameter identifier 674BA includes a peak cell rate (PCR) and a sustainable cell rate (SCR), and the corresponding node type dependent QoS parameter computing functions 674BB of "PCR computing function" and "SCR computing function" are stored.

As shown in FIG. 12, the node type dependent QoS parameter computing function 674BB is constituted of a field of a constant parameter 674BBA and a field of several node common QoS parameter correspondence coefficients 674BBB (674BBB-1 to 674BBB-n).

For example, a definition of QoS parameters will be described by taking QoS parameters for the QoS class X using the bandwidth information as a variable, as an example of the node common QoS parameters 664B for the node type "ATM switch". In the example shown in FIG. 12, the following definition may be made: if a variable bandwidth class (VBR) is used as the ATM service class for the service of the QoS class X of "ATM switch", the twofold values of the bandwidth parameter values designated by the node common QoS parameters 664B and the bandwidth parameter values themselves may be used respectively as PCR and SCR parameters of VBR. More specifically, the following definition is made for the node type dependent QoS parameter conversion information 674B for the node type identifier 672 of "ATM switch" and the QoS class identifier 674A of "Class 1".

First, in the node type dependent QoS parameter conversion information 674B of each class shown in FIG. 11, the node type dependent QoS parameter computing function 674BB shown in FIG. 12 for each of the two identifiers PCR and SCR is made of a table constituted of the constant parameter 674BBA and three node common QoS parameter correspondence coefficients 674BB. As the node type dependent QoS parameter computing functions 674BB of the node type dependent parameter identifiers 674BA, the constant parameter 674BBA is set with "1" and the coefficients 674BBB are set with "2", "1" and "0.5" for PCR, whereas the constant parameter 674BBA is set with "0" and the coefficients 674BBB are set with "1", "1" and "0.5" for SCR. In this case, the QoS parameters are calculated by the equations $1+2x+1y+0.5z$ and $0+1x+1y+0.5z$ where x, y and z are variables.

In the above example, a first order function is used as the parameter computing function. A maximum/minimum value field may be added to the table shown in FIG. 11 to limit the calculated values in the range of values in the maximum/minimum value field. Alternatively, a parameter computing function may be written with interpreter language to incorporate more complicated function computation and condition judgement.

In this embodiment, a logical connection can be set which connection guarantees all nodes and communication lines on the route the QoS designated by the logical connection management information 660.

Since the QoS parameter conversion information is supplied, even if the network has nodes supporting different service classes and having different characteristics and has a plurality kind of communication lines such as ATM switches and frame relays, a network management person is not required to designate QoS parameters of each node in accordance with the QoS ranks, but sets and manages only the node independent common QoS information 664 so that a burden of the network management person can be reduced.

Since the QoS parameter conversion information is not fixed to each node but it is distributed from the network manager 600 to each node, it is easy to define a new QoS of the network and change a conversion rule of a particular node.

Since the QoS parameter can be obtained through computation or by using interpreter language or the like, parameters can be set flexibly.

Next, with reference to FIG. 13, the overall processes to be executed by the network management system of the embodiment will be described.

At Step S100, the network manager 600 receives definitions entered by a network management person through the management information definition unit 610 to thereby store the IP-logical connection conversion information 650, logical connection management information 660 and QoS parameter conversion information 670.

Next, at Step S200 in cooperation with the QoS parameter conversion information initializing units 110, 210 and 410 of the nodes 100, 200 and 400, the network manager 600 distributes the QoS parameter conversion information 670 to the nodes 100, 200 and 400. The nodes 100, 200 and 400 store the received QoS parameter conversion information 670 in the node type dependent QoS parameter conversion information storage devices 150, 250 and 450. The details of this process will be later described with reference to FIG. 14.

Next, at Step S300 by using the logical connection setting request unit 630, the network manager 600 instructs the nodes 100, 200 and 400 on the logical connections 510, ..., 560 to set logical connections in the logical connection management information 660. The instructed nodes 100, 200 and 400 set the logical connections 510, ..., 560 by using the logical connection setting units 120, 220 and 420. The details of this process will be later described with reference to FIGS. 15 and 16.

Next, at Step S400 the network manager 600 distributes the IP-logical connection conversion information 650 to the edge nodes 200 and 400 at both ends of the logical connection set at Step S300. The details of this process will be later described with reference to FIG. 17.

After completion of the above processes, at Step S400 the nodes 100, 200 and 400 start transferring IP packets. The nodes 100, 200 and 400 received IP packets distribute the IP packets to proper logical connections. The details of this process will be later described with reference to FIGS. 18 and 19.

Next, with reference to FIGS. 14 to 19, the detailed contents of each process shown in the flow chart of FIG. 13 will be described.

First, with reference to FIG. 14, the detailed contents of the process of distributing QoS parameter conversion information at Step S200 in the flow chart of FIG. 13 will be described.

At Step S210, when the nodes 100, 200 and 400 of the communication network managed by the network manager 600 are activated, the network manager 600 sets physical or logical operation management communication lines 700 to the nodes 100, 200 and 400. Information exchange between the network manager 600 and nodes 100, 200 and 400 is performed over the operation management communication lines 700 set at Step S210.

Next, at Step S220 by using the QoS parameter conversion information initializing units 110, 210 and 410, the nodes 100, 200 and 400 notify the network manager 600 of the node type information. The node type includes a router, an ATM switch, a frame relay switching system and the like. At Step S220, the node type identifier 672, which is a unique value assigned to each node type, is transmitted.

Next, at Step S230 by using the QoS parameter conversion distribution unit 620 the network manager 600 retrieves the node type dependent QoS parameter conversion information 674 corresponding to the nodes 100, 200 and 400 from the QoS parameter conversion information 670 shown in FIG. 9, by using the node type identifiers 672 supplied from the nodes 100, 200 and 400 as retrieval indexes.

Next, at Step S240 by using the QoS parameter conversion information distribution unit 620 the network manager 600 distributes the node type dependent QoS parameter conversion information 674 retrieved at Step S230 to the nodes 100, 200 and 400.

Next, at Step S250 by using the QoS parameter conversion information initializing units 110, 210 and 410 the nodes 100, 200 and 400 store the node type dependent QoS parameter conversion information 674 distributed by the network manager 600 in the node type dependent QoS conversion information storage devices 150, 250 and 450.

Next, with reference to FIG. 15, the detailed contents of the logical connection setting process at Step S300 in the flow chart of FIG. 13 will be described.

At Step S310, by using the logical connection setting request unit 630 the network manager 600 selects logical connections to be set, by referring to the logical connection management information 660. Namely, in accordance with the logical connection management information 660 shown in FIG. 6, logical connections such as "route 1" and "route 2" are selected.

Next, at Step S320, by referring to the routing information 662 shown in FIG. 7 of the logical connections selected at Step S310 in the logical connection management information 660, the network manager 600 selects nodes to which the logical connections are set. For example, if the "route 1" is selected at Step S310, the edge node of the gateway 400a, the relay nodes 100A and 100c and the edge node of the terminal 200C corresponding to the node identifiers 662A of "n1", "n5", "n7" and "n4" are selected.

Next, at Step S330 the network manager 600 distributes the following information to the selected nodes to instruct them to set logical connections, the information including the QoS information 664 of the logical connection management information 660 corresponding to the logical connections selected at Step S310 as well as the input I/F numbers 662B, output I/F numbers 662c, input connection identifiers 662D and output connection identifiers 662E respectively of the routing information 662 corresponding to the nodes selected at Step S320. For example,. if the "route 1" is selected, distributed to the relay node 100A having the node identifier 662A of "n5" are the input I/F number 662B of "p1", output I/F number 662C of "p3", input connection identifier 662D of "i64" and output connection identifier 662E of "i70".

Next, at Step S340 the nodes 100, 200 and 400 receive the logical connection setting instruction. If the received node is the relay node 100, the routing information received at Step S330 is stored in the connection identifier conversion information storage device 170.

Next, at Step S350 the nodes 100, 200 and 400 received the logical connection setting request distributed at Step S330 covert the distributed QoS information 664 into the node type dependent QoS parameters assigned to the logical connections to be set, by referring to the node type dependent QoS parameter conversion information storage devices 150, 250 and 450.

Figure 16:
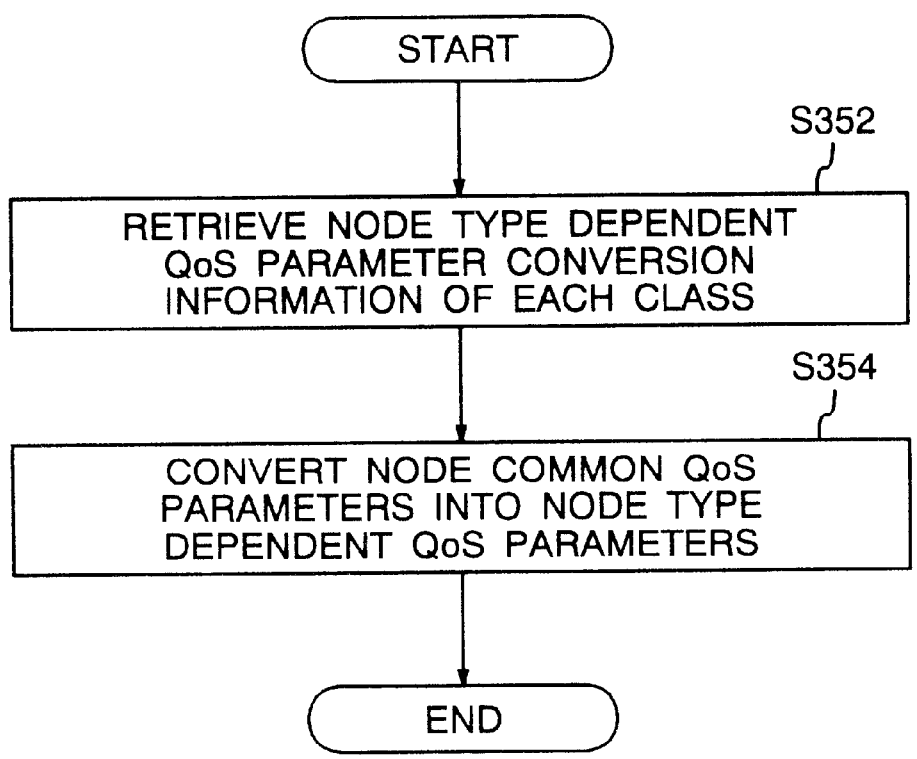
FIG. 16 is a flow chart illustrating the detailed contents of a conversion process into node type dependent parameters to be executed by the network management system of the embodiment.

The detailed contents of the conversion process in to node type dependent QoS parameters at Step S350 in the flow chart of FIG. 15 will be described with reference to FIG. 16.

At Step S352, by using the logical connection setting units 120, 220 and 420, the nodes 100, 200 and 400 retrieve the node type dependent Qos parameter conversion information 674 of each class shown in FIG. 10 corresponding to the QoS class in the QoS information 664 shown in FIG. 6, from the node dependent QoS parameter conversion information storage devices 150, 250 and 450.

Next, at Step S354 the nodes 100, 200 and 400 substitute the node common QoS parameters 664B in the QoS information 664 shown in FIG. 8 into the node type dependent QoS parameter computing functions 674BB in the node type dependent QoS parameter conversion information 674 shown in FIG. 11 to thereby convert the parameters 664B into QoS parameters.

Reverting to FIG. 15, at Step S360 the nodes 100, 200 and 400 set the instructed logical connections by using the distributed input I/F numbers 662B, output I/F numbers 662C, input connection identifiers 662D, output connection identifiers 662E and the node type dependent QoS parameters obtained at Step S350.

Next, at Step S370 the network manager 600 repetitively executes Steps S330 to S360 for all nodes on the logical connections selected at Step S320. If there is other logical connections to be set, being different from those selected at Step S320, then the network manager 600 executes Steps 310 to S360 for the other logical connections at Step S380.

Figure 17:
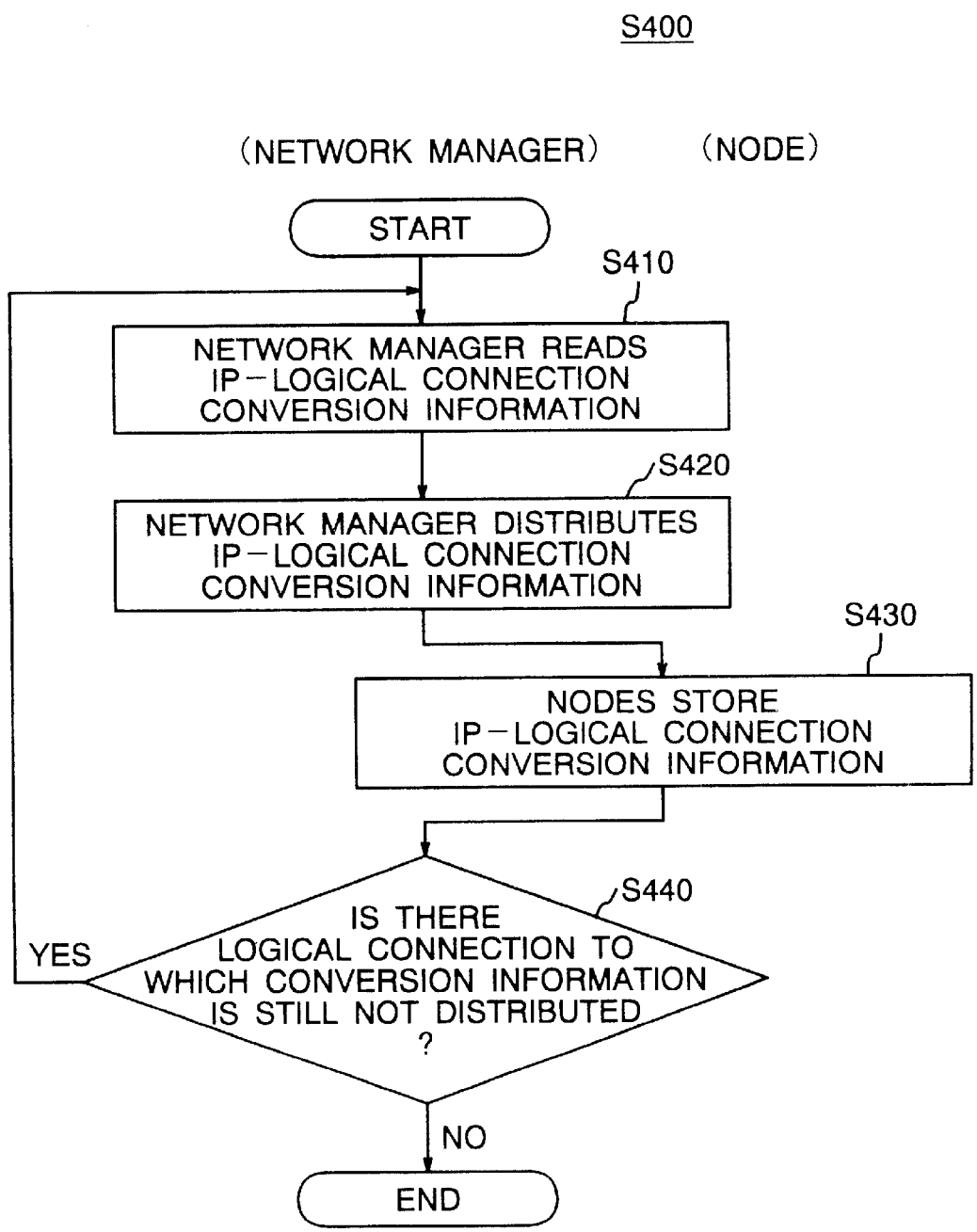
FIG. 17 is a flow chart illustrating the detailed contents of an IP-logical connection conversion information transfer process to be executed by the network management system of the embodiment.

Next, with reference to FIG. 17, the detailed contents of the distribution process for the IP-logical connection conversion information at Step S400 in the flow chart of FIG. 13 will be described.

At Step S410 by using the logical connection setting request unit 630 the network manager 600 reads the IP-logical connection conversion information 650 and, by referring to the node identifiers 652 therein, selects the edge nodes 200 and 400 to which the IP-logical connection conversion information 654 of respective nodes are distributed.

Next, at Step S420 the network manager 600 distributes the IP-logical connection conversion information 654 to the edge nodes 200 and 400 selected at Step S410.

Next, at Step S430 the edge nodes 200 and 400 store the received the IP-logical connection conversion information 654 of each node in the IP-logical connection conversion information storage devices 260 and 460 by using the logical connection setting units 220 and 420.

At Step S440, if there are the edge nodes 200 and 400 to which the IP-logical connection conversion information 650 is still not distributed, the network manager 600 repetitively executes Steps S410 to S430 for these edge nodes 200 and 400.

Figure 18:
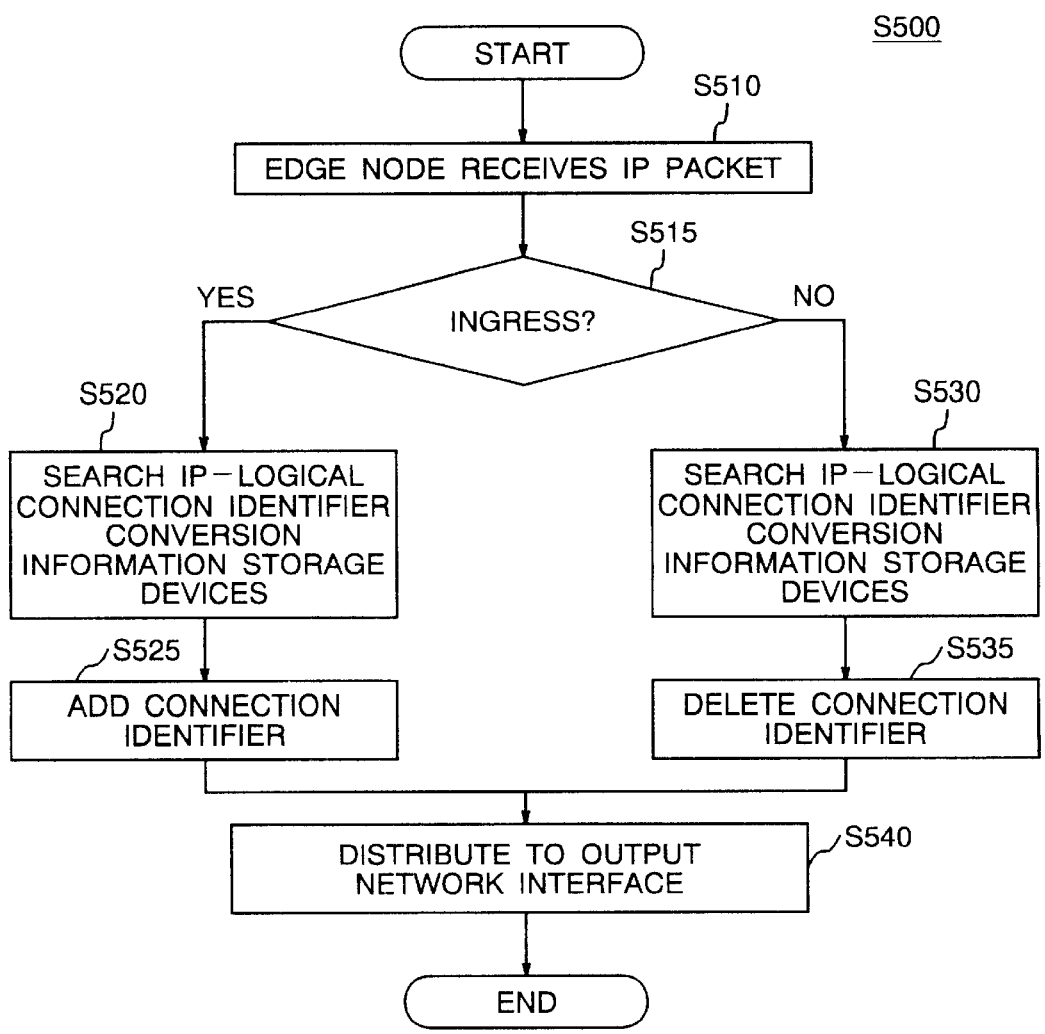
FIG. 18 is a flow chart illustrating the detailed contents of an IP packet transfer process to be executed by an edge node in the network management system of the embodiment.

Next, with reference to FIG. 18, the detailed contents of the IP packet distribution process to be executed by the edge node at Step S500 in the flow chart of FIG. 13 will be described.

At Step S510, the edge nodes 200 and 400 received the IP packet start the distribution process by using the packet transfer units 230 and 430.

Next, at Step S515 it is checked whether the edge nodes 200 and 400 are an ingress or egress of each logical connection. If it is the ingress, the flow advances to Step S520, whereas if it is the egress, the flow advances to Step S530. In the case of the "route 1" of the logical connection shown in FIG. 2, the gateway 400A is the ingress and the terminal 200C is the egress.

If the node is the ingress, at Step S520 the edge nodes 200 and 400 search the contents of the IP-logical connection conversion information storage devices 260 and 460 by using as a search key the source and destination IP address information 654B, 654C, 654G and 654H of the received IP packet, transport layer protocol types 654D and 654I, application port numbers 654E and 654J and input network interface 654A shown in FIG. 5, and acquires the logical connection identifier 654K and output network interface number 654F matching the IP packet to be distributed.

Next, at Step S525, the edge nodes 200 and 400 add the logical connection identifier 654K acquired at Step S520 to the IP packet to be distributed.

If the edge node is the egress, at Step S530 the edge nodes 200 and 400 search the contents of the IP-logical connection conversion information storage devices 260 and 460 by using as a search key the input network interface number 654A and connection identifier 654K of the received IP packet, and acquires the output network interface number 654F matching the IP packet.

Next, at Step S535 the edge nodes 200 and 400 remove the connection identifier 654K from the received packet.

At Step S540, the packet transfer units 230 and 430 of the edge nodes 200 and 400 distribute the IP packet to the interface having the output network interface number 654F acquired at Step S520 or S530.

Figure 19:
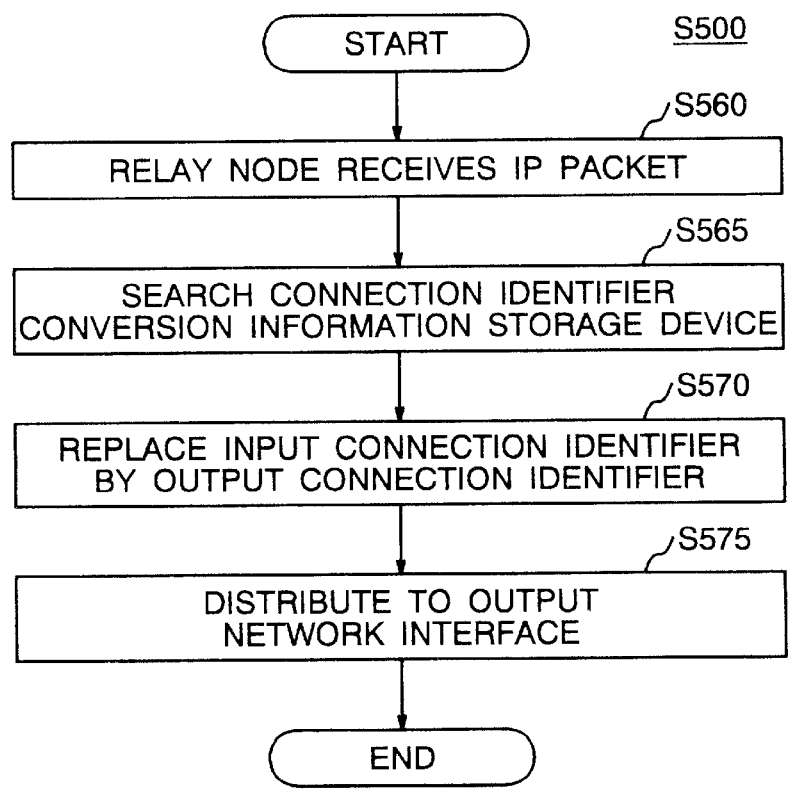
FIG. 19 is a flow chart illustrating the detailed contents of an IP packet transfer process to be executed by a relay node in the network management system of the embodiment.

Next, with reference to FIG. 19, the detailed contents of the IP packet distribution process to be executed by the relay node at Step S500 in the flow chart of FIG. 13 will be described.

At Step S565 the relay node 100 searches the contents of the connection identifier conversion information storage device 170 by using as a search key the input I/F number 662B and input connection identifier 662D of the received IP packet, and acquires the output I/F number 662C and output connection identifier 662E.

Next, at Step S570 the relay node 100 replaces the input I/F number 662B of the IP packet by the output connection identifier 662E.

Next, at Step S575 the packet transfer units 130, 230 and 430 of the relay node 100 distribute the IP packet to the interface having the output I/F number 662C acquired at Step S565.

Figure 20:
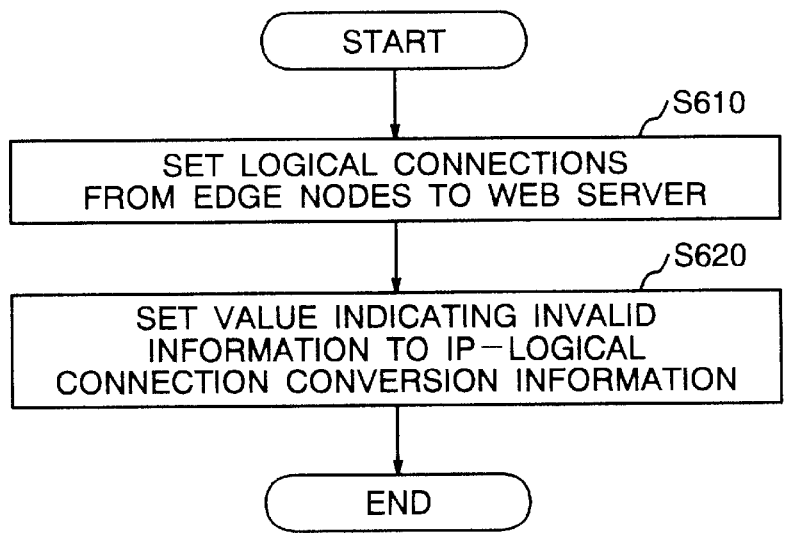
FIG. 20 is a flow chart illustrating a network configuring process to be performed by a network managing person of the network management system of the embodiment.

Next, with reference to FIG. 20, a network configuring process to be executed by a network management person will be described.

Figure 3:
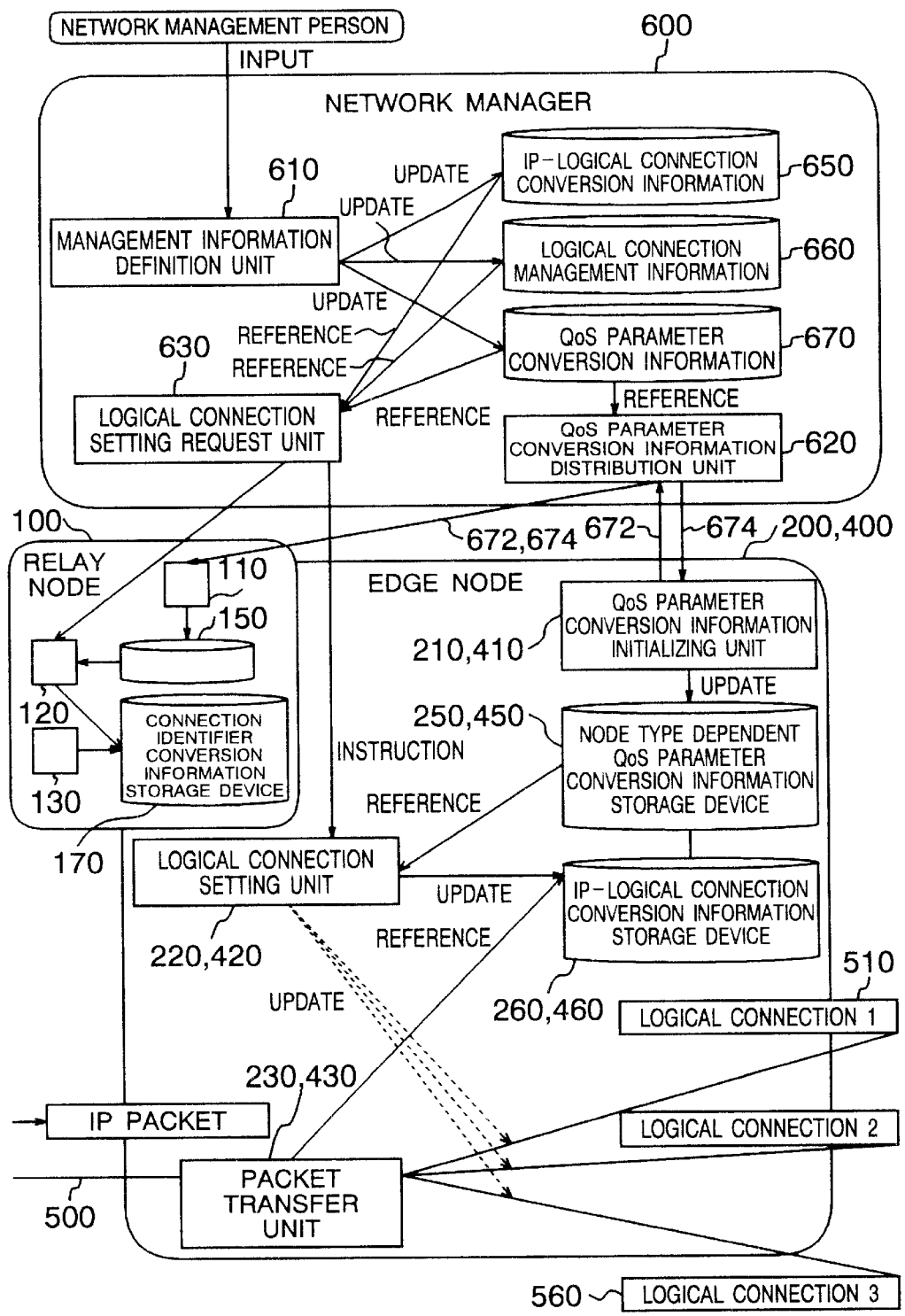
FIG. 3 is a block diagram showing the structure of a network manager and a node used by the network management system of the embodiment.

At Step S610, a network management person defines the logical connection management information 660 shown in FIG. 3 to set the logical connections 510, 520, 530, 540, 550 and 560 each having different and specific QoS and extending from the edge nodes of terminals 200A and 200B and gateway 400A toward the Web server 205c so as to configure the network shown in FIG. 2.

Next, at Step S620 by using the management information definition unit 610 the network management person sets the IP-logical connection conversion information 650 to make the edge nodes of terminals 200A and 200B and gateway 400A distribute the IP packet to the logical connections set at Step S610, without specifying the source. The IP packet has the destination IP address 654G of the Web server 205C, the destination transport layer protocol type 654I of TCP/IP and the destination application port number 654J of the Web server port number. More specifically, at Step S620, of the fields of the IP-logical connection conversion information 654 of each node shown in FIG. 5, the fields of the input network interface number 654A, source IP address 654B, IP sub-net mask 654C, transport layer protocol number 654D and application port number 654e are all set with a value (e.g., "0") indicating that the information in the field is invalid.

Another method of distributing an IP packet to logical connections without specifying the source, will be described with reference to FIG. 21.

With this method, valid/invalid information 680 is added to the fields 654A, . . . , 654J except the connection identifier 654K of the IP-logical connection conversion information 654 of each node.

At the same time when the IP-logical connection conversion information 654 is defined for each edge node, a network management person defines the valid/invalid information 680 of each field of the IP-logical connection conversion information 654 of each node except the field of the connection identifier 654K. Each field of the valid/invalid information 680 is set with "1" if the information is made valid, and with "0" if the information is made invalid. In the example shown in FIG. 21, the output network interface 654F, destination IP address 654G, destination protocol type 654I and destination application port number 654J are made "valid", whereas the input network interface 654A, source IP address 654B, source IP sub-net mask 654C, source protocol type 654D, source application port number 654E and destination IP sub-net mask 654H are made "invalid". By invalidating the input network interface 654A, source IP address 654B, source IP sub-net mask 654C, source protocol type 654D and source application port number 654E, the source is made free. By invalidating the destination IP sub-net mask 654H, the Web server 205C itself can be accessed.

Figure 21:
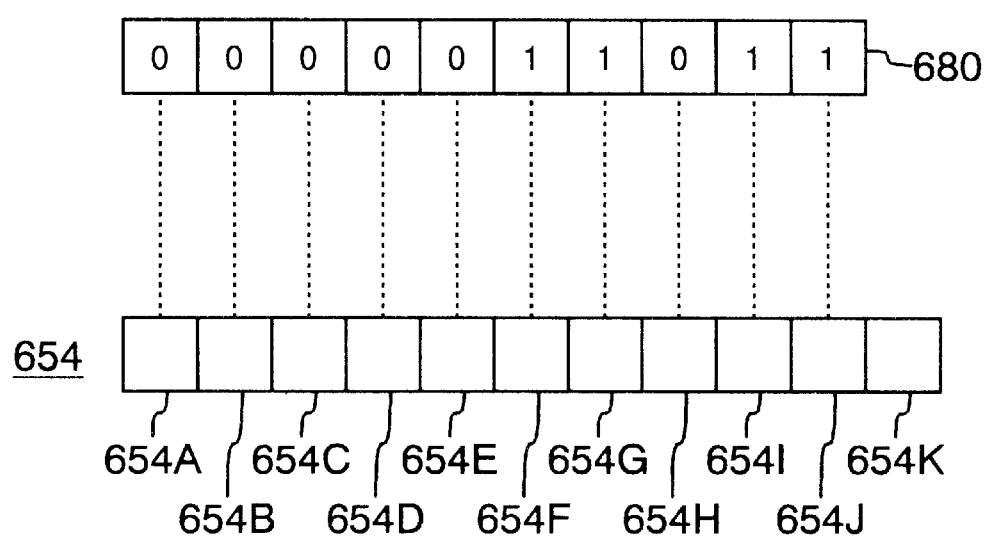
FIG. 21 is a diagram illustrating another method of transferring an IP packet to a logical connection without specifying a transmission source in the network management system of the embodiment.

By defining the valid/invalid information 680 shown in FIG. 21 for the edge node of gateway 400A shown in FIG.

2, the IP packet to be distributed to the logical connection 510 is limited only to such an IP packet whose destination is the Web server 205C whose application is "http". Irrespective of the contents of the invalidated information in the IP packet such as source IP address etc. when the definition of the valid/invalid information 680 is made as shown in FIG. 21, the IP packet is distributed to the logical connections if the packet matches the valid information.

In this embodiment, logical connections to the Web server can be set independently from other logical connections to other nodes, the communication traffics to the Web server do not affect communications with other nodes.

As described so far, according to the embodiments, the QoS such as the bandwidth of the whole network is controlled. Therefore, even if accesses are concentrated upon a particular application, a particular Web server or the like, other traffics are not hindered and the network can be operated efficiently. More specifically, a different communication route can be set for a particular communication and the QoS of the particular communication can be guaranteed. Conversely, the traffics and routes for the particular communication can be limited so that other communications are not hindered.

The QoS can be collectively mapped for respective node types by defining the rank of the QoS of the whole network. It is therefore possible to guarantee the QoS independently from the node type. For example, it is not necessary to set QoS parameters corresponding to the QoS rank for each of nodes. The logical connections can be set by designating node independent parameters without designating node dependent specific parameters.

It is also possible to set logical connections by designating only the destination address without specifying the source. Further, the logical connections can be set and used by designating the kind of application, and the conditions of using these logical connections can be set flexibly.

Since the QoS parameters are acquired through computation, the parameters can be set flexibly.

According to the invention, even if accesses are concentrated upon a particular application, the communication traffics to this application can be prevented from hindering other IP traffics, irrespective of whether the network utilizes the router system and ATM system.

The number of logical connections does not become insufficient even in the ATM network.

What is claimed is:

1. A network management system having edge nodes and a relay node constituting a communication network, and a network manager for managing said edge nodes and said relay node;

wherein said network manager comprises a logical connection setting request unit that:
determines a communication route comprised of at least one logical connection in said communication network; and
requests setting said logical connection from said edge nodes and/or said relay node at both ends of said logical connection; and wherein said relay node and/or said edge nodes comprise a logical connection setting unit that sets said logical connection responsive to said request, wherein at least one of said edge nodes of said communication route further comprises a packet transfer unit that transfers a received packet;

wherein said network manager further comprises a distributing unit that distributes IP-logical conversion information to said at least one edge node, wherein, referring to said IP-logical conversion information, said packet transfer unit of said at least one edge node as an ingress node of said communication route adds a logical connection identifier to an appropriate packet out of said received packet and outputs said packet to an appropriate logical connection; and wherein, referring to said IP-logical conversion information, said packet transfer unit of said at least one edge node as an egress node of said communication route removes said logical connection identifier added at said ingress node from the packet and transmits said packet to the destination thereof, wherein said network manager further comprises:
a conversion information distributing unit that distributes QoS parameter conversion information to said relay node and/or one of said edge nodes, said conversion information being used when a node independent QoS parameter is converted into a node dependent QoS parameter; and
a parameter distributing unit that distributes said node independent QoS parameter to said relay node and/or one of said edge nodes;

wherein said relay node and/or one of said edge nodes further comprises a conversion unit that converts said distributed node independent QoS parameter into said node dependent QoS parameter by referring to said distributed conversion information; and wherein said network manager may define a parameter computing function to set said QoS parameter conversion information to said relay node and each of said edge nodes.

2. A network management system according to claim 1, wherein said conversion information distributing unit of said network manager sets a field of said IP-logical conversion information with valid/invalid and/or the value of the field, the field includes a sub-field for limiting a transmission source and a sub-field for limiting a destination and said network manager specifies at least one of the sub-fields.

3. A network management system according to claim 2, wherein said field of said IP-logical conversion information indicates a destination IP address, an IP sub-net mask, a destination transport layer protocol type or a destination application port number.

4. A network management system according to claim 2, wherein said field of said IP-logical conversion information indicates a transmission source IP address, a transmission source IP sub-net mask, and a transmission source transport layer protocol type or a transmission source application port number.

* * * * *